US012771609B2

(12) United States Patent
Cai et al.

(10) Patent No.: US 12,771,609 B2
(45) Date of Patent: Oct. 20, 2026

(54) SCALING ARRANGEMENT AND METHOD PERFORMED THEREIN

(71) Applicant: Telefonaktiebolaget LM Ericsson (publ), Stockholm (SE)

(72) Inventors: Xuejun Cai, Taby (SE); Jinhua Feng, Taby (SE); Selome Kostentinos Tesfatsion, Upplands Vasby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/718,323

(22) PCT Filed: Dec. 10, 2021

(86) PCT No.: PCT/SE2021/051229

§ 371 (c)(1),
(2) Date: Jun. 10, 2024

(87) PCT Pub. No.: WO2023/106980

PCT Pub. Date: Jun. 15, 2023

(65) Prior Publication Data

US 2025/0097117 A1 Mar. 20, 2025

(51) Int. Cl.
*H04L 41/0897* (2022.01)
*H04L 41/5009* (2022.01)

(52) U.S. Cl.
CPC ...... *H04L 41/0897* (2022.05); *H04L 41/5009* (2013.01)

(58) Field of Classification Search
CPC ............. H04L 41/0897; H04L 41/5009; H04L 41/0886; H04L 41/0893; H04L 41/0896;
(Continued)

(56) References Cited

U.S. PATENT DOCUMENTS

2011/0078303 A1 3/2011 Li et al.
2015/0263960 A1 9/2015 Kasturi
(Continued)

FOREIGN PATENT DOCUMENTS

CN 113296882 A 8/2021
CN 113760516 A 12/2021
(Continued)

OTHER PUBLICATIONS

Translation of CN113296882 (Year: 2025).*
(Continued)

*Primary Examiner* — Alina A Boutah
(74) *Attorney, Agent, or Firm* — FBT Gibbons LLP

(57) ABSTRACT

Embodiments herein disclose for example a method performed by a scaling arrangement (13) for managing resources in a communication network associated with a multiple cloud infrastructure, wherein the scaling arrangement comprises a global auto-scaler (131) and one or more local auto-scalers (132). The scaling arrangement determines, at the global auto-scaler (131) of the scaling arrangement (13), to perform one or more actions based on at least resource information stored at the global auto-scaler; wherein the resource information is associated with resources structured in multiple clouds comprising one or more local clusters of resources. The one or more actions comprise modifying a parameter related to at least one of the resources of the multiple clouds. The scaling arrangement sends a modifying request to at least one local auto-scaler out of the one or more local auto-scalers (132), requesting to perform one or more operations related to the modified parameter.

20 Claims, 8 Drawing Sheets

(58) Field of Classification Search

CPC . H04L 67/10; H04L 67/1001; H04L 67/1004; G06F 9/5072; G06F 9/5083; G06F 9/5077

See application file for complete search history.

(56) References Cited

U.S. PATENT DOCUMENTS

| | | | | |
|---|---|---|---|---|
| 2016/0323197 | A1* | 11/2016 | Guzman | G06F 9/5083 |
| 2020/0104190 | A1* | 4/2020 | Fildebrandt | G06F 9/5088 |
| 2020/0218580 | A1* | 7/2020 | Kim | G06F 9/5072 |
| 2020/0344270 | A1* | 10/2020 | Nilsson | H04L 67/562 |
| 2020/0401452 | A1 | 12/2020 | Piercey | |
| 2021/0149745 | A1* | 5/2021 | An | G06F 9/5083 |
| 2022/0050720 | A1* | 2/2022 | Dumba | G06F 9/5011 |
| 2022/0417173 | A1* | 12/2022 | Jijumon | H04L 43/0852 |
| 2024/0012674 | A1* | 1/2024 | Xie | G06F 9/5077 |

FOREIGN PATENT DOCUMENTS

| | | | | |
|---|---|---|---|---|
| KR | 20230069487 A | * | 5/2023 | G06F 9/4862 |
| WO | WO-2022096136 A1 | * | 5/2022 | H04L 67/2866 |

OTHER PUBLICATIONS

Merkouche et al., “A Hybrid approach for containerized Microservices auto-scaling,” 2022 IEEE/ACS 19th International Conference on Computer Systems and Applications (AICCSA) | 979-8-3503-1008-5/22/$31.00 © 2022 IEEE | DOI: 10.1109/AICCSA56895.2022.10017677. (Year: 2022).*

Bacchiani, Bravetti, Giallorenzo, Mauro, Talevi, Zavattaro: “Microservice Dynamic Architecture-Level Deployment Orchestration”, Jun. 8, 2021 (Jun. 8, 2021), XP047597907.

Kardani-Moghaddam, Rajkumar, Kotagiri:“ADRL: A Hybrid Anomaly-Aware Deep Reinforcement Learning-Based Resource Scaling in Clouds”, IEEE Transactions on Parallel and, Mar. 2021.

Sahni, Vidyarthi: “Heterogeneity-aware elastic scaling of streaming applications on cloud platforms” The Journal of Supercomputing, vol. 77, No. 9, Mar. 5, 2021 (Mar. 5, 2021).

European Search Report dated Dec. 19, 2024 for EP Application No. 21967401.7, 10 pages.

Federated Pod Autoscaler, Kubernetes/Community, pp. 1-8, downloaded from the Internet on Jun. 11, 2021 [https://github.com/kubernetes/community/blob/master/contributors/design-proposals/multicluster/federated-hpa.md.

Anthos, Cloud.Google, pp. 1-24, Jun. 11, 2021.

Kubernetes Cluster Federation, pp. 1-5, Jun. 11, 2021.

Tamiru, Mulugeta et al., mck8s: An orchestration platform for geo-distributed multi-cluster environments, ICCCN 2021—30th International Conference on Computer Communications and Networks, Jul. 2021, Athens, Greece.

Rossi, Fabiana, Hierarchical Scaling of Microservices in Kubernetes, IEEE International Conference on Autonomic Computing and Self-Organizing Systems (ACSOS), 2020, pp. 28-37, DICII, University of Rome for Vergata, Italy.

* cited by examiner

SCALING ARRANGEMENT AND METHOD PERFORMED THEREIN

TECHNICAL FIELD

Embodiments herein relate to a scaling arrangement, and a method performed therein for communication. Furthermore, a computer program product and a computer readable storage medium are also provided herein. In particular, embodiments herein relate to handling cloud computing in a communication network associated with multiple cloud infrastructure.

BACKGROUND

In a typical communication network, User equipments (UE), also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB, or a gNodeB. A service area or cell area is a geographical area where radio coverage is provided by the radio network node. The radio network node communicates over an air interface operating on radio frequencies with the UE within range of the radio network node.

In cloud computing, horizontal scaling, i.e., scale out/in, means to add more resource units, e.g., adding a node or a virtual machine (VM), into a system or remove one or more resources or resource units from the system. In a Kubernetes cluster, a Horizontal Pod Auto-scaler (HPA) is able to scale the number of points of delivery (pod) available in a cluster of resources such as processor or memory capacity, also referred to as pods, to handle computational workload requirements of an application. A pod is a basic compute unit and represents a single instance of a running process in a cluster of resources. Pods comprises one or more containers, and when a pod runs multiple containers, the containers are managed as a single entity and share the pod's resources. Pods may also be referred to as replicates or replicate pods. The HPA determines the number of pods needed based on metrics set by a user and applies the creation or deletion of pods based on predefined rules. In most cases, these metrics are central processing unit (CPU) and random access memory (RAM) usage, but it is also possible to specify custom metrics.

The HPA is implemented as a Kubernetes application programming interface (API) resource and a controller, see FIG. 1. The resource determines the behavior of the controller. The controller periodically adjusts the number of replicates, i.e., pods such as processor and/or memory units, in a replication controller or deployment to match the observed metrics such as average CPU utilization, average memory utilization or any other custom metric to the target specified by the user. As stated above, the pod is a module of network, compute, storage, and application components that work together to deliver a networking service, and the pod is a repeatable design pattern and may also be referred to as replicates or replicate pods.

From the most basic perspective, the HPA operates on the ratio between desired metric value and current metric value:

desiredReplicates=ceil[currentReplicates*(currentMetricValue/desiredMetricValue)]

For example, if the current metric value is 200, and the desired value is 100, the number of replicate pods will be doubled, since 200.0/100.0=2.0. Metrics may for example be time units or similar. If the current value is instead 50, the number of replicate pods will be reduced to half, since 50.0/100.0=0.5.

But it is to be noted that the HPA is designed for the horizontal scaling within a single cluster of resources. Cluster herein meaning a number of pods configured as a cluster of pods based on, e.g., proximity.

More and more enterprise users are considering deploying their applications, e.g., edge-based services, across multiple clouds, which can bring many benefits: wide geographic coverage, better availability and reliability, avoiding vendor lock-in, performance enhancement, etc.

There are already several multi-cloud platforms available in the market, e.g., https://cloud.google.com/anthos, which is one of the first commercial platforms. It can support Kubernetes clusters provided by Amazon Web Services (AWS) and Microsoft Azure. A multi-cloud platform can manage applications across multiple clusters belonging to single or multiple clouds, provide container orchestration, centralized config management, and managed service. The multi-cloud platform may also provide a service called Multi-Cluster Ingress (MCI), which supports deploying shared load balancing resources across clusters. One important usage is to route a request from an end user to the cluster that is closest to the end-user in order to provide the best Quality of Experience (QoE).

Multi-cloud herein means a cloud environment that comprises cloud infrastructures from more than one cloud provider, and a cloud infrastructure from the same provider can contain one or more clusters of resources. Therefore, a multi-cloud is also considered as a multi-cluster environment. But it is to be noted that a multi-cluster environment is not always a multi-cloud, because the multi-cluster can belong to the same cloud provider, see FIG. 2.

There are also some open source projects to support the distribution of the workload across multiple Kubernetes clusters. One of the most well-known and official implementation is Federated Kubernetes v2 (Kubefed), see https://github.com/kubernetes-sigs/kubefed. It allows users to coordinate the configurations of multiple Kubernetes clusters on the basis of a single set of APIs from within a host cluster, and deploy federated resources across the multiple clusters.

Multi-cloud platforms may manage multiple clusters across different cloud providers and may provide features like orchestration, load balancing, security, etc., however, the multi-cloud platforms don't have support for global horizontal autoscaling across the managed multiple clusters yet. The user can deploy an HPA into each cluster separately, but the HPAs can only manage the horizontal scaling within the single cluster. It has several disadvantages: firstly, the resilience and resource utilization are limited to a single cluster. Secondly, the each HPA needs to be installed and configured separately for each cloud and cluster, which could cause additional complexity or problems, especially if there are lots of clusters to be managed.

In Kubernetes Special Interest Group (SIG) multi-cluster, there is a Kubernetes Enhancement Proposal on Federated HPA, see https://github.com/kubernetes/community/blob/master/contributors/design-proposals/multicluster/federated-hpa.md, but the proposal is at a very abstract level and doesn't provide the detail description of the system and method. In addition, the proposed concept has several disadvantages, e.g., it only proposes to distribute and rebalance the minimum and maximum number of the replicate pods across the multiple clusters, which could limit the scaling ability and performance across multi-clouds, e.g., could cause load imbalance across the clusters, other factors like desired performance level affecting the scaling are not considered.

The document "mck8s: An orchestration platform for geo-distributed multi-cluster environments", Mulugeta Tamiru, Guillaume Pierre, Johan Tordsson, and Erik Elmroth, ICCCN, July 2021, proposes a Multi-Cluster Horizontal Pod Autoscaler (MCHPA). It is a centralized solution, in which the central MCHPA needs to manage the Pod scaling in all the clusters in the environment. It collects performance metrics from all clusters, which will bring additional complexity and overhead, and has limited scalability; additionally when the centralized auto-scaler fails, the horizontal scaling will completely stop working for all clusters, and if a communication problem occurs between some managed clusters of resources, horizontal scaling for the affected clusters will fail.

SUMMARY

An object of embodiments herein is to provide an efficient global horizontal autoscaling across multiple clouds each comprising one or more clusters of resources.

According to an aspect the object may be achieved by a method performed by a scaling arrangement for managing resources in a communication network associated with a multiple cloud infrastructure. The scaling arrangement comprises a global auto-scaler and one or more local auto-scalers. The scaling arrangement determines, at the global auto-scaler of the scaling arrangement, to perform one or more actions based on at least resource information stored at the global auto-scaler. The resource information is associated with resources structured in multiple clouds comprising one or more local clusters of resources; and the one or more actions comprise modifying a parameter related to at least one of the resources of the multiple clouds. The scaling arrangement sends a modifying request to at least one local auto-scaler out of the one or more local auto-scalers, requesting to perform one or more operations related to the modified parameter.

According to another aspect the object may be achieved by providing a scaling arrangement for managing resources in a communication network associated with a multiple cloud infrastructure. The scaling arrangement comprises a global auto-scaler and one or more local auto-scalers. The scaling arrangement is configured to determine, at the global auto-scaler of the scaling arrangement, to perform one or more actions based on at least resource information stored at the global auto-scaler. The resource information is associated with resources structured in multiple clouds comprising one or more local clusters of resources; and the one or more actions comprise modifying a parameter related to at least one of the resources of the multiple clouds. The scaling arrangement is further configured to send a modifying request to at least one local auto-scaler out of the one or more local auto-scalers, requesting to perform one or more operations related to the modified parameter.

It is furthermore provided herein a computer program product comprising instructions, which, when executed on at least one processor, cause the at least one processor to carry out any of the methods herein, as performed by the scaling arrangement. It is additionally provided herein a computer-readable storage medium, having stored thereon a computer program product comprising instructions which, when executed on at least one processor, cause the at least one processor to carry out any of the methods herein, as performed by the scaling arrangement.

Herein global horizontal autoscaling means that the scaling is performed for resources, e.g., processor units and/or memory units, spanning multiple clouds comprising one or more cluster of resources. While the normal horizontal autoscaling in a single cluster only changes the number of pods in that particular cluster and is independent from other clusters, embodiments herein may, for example, change the number of pods deployed in multiple clusters according to a global scaling policy. In addition, a scaling rule or parameter for the local auto-scalers in the clusters may also be changed to achieve the global scaling. The global autoscaling may also interact with the global load balancing or traffic redirection function provided by a multi-cloud platform, e.g., a load balancer such as a Multi-Cluster Ingress (MCI), and the global load balancing may have an impact on the resource usage and performance, which would further affect the horizontal scaling.

The proposed scaling herein is an autoscaling in a hybrid mode, i.e., some functionalities may be processed by local auto-scalers located in each cluster, while some functionalities are managed by the global auto-scaler located in a central or managing node. The proposed global autoscaling may mainly be performed through interaction between three components in the multi-cluster platform, e.g., a central global auto-scaler; a local auto-scaler in each cluster; and may also use a load balancer such as an MCI or another type of global load balancer. The global auto-scaler, such as a global horizontal pod auto-scaler (GHA), is herein responsible for managing a local auto-scaler, such as a local HPAs (LHPA), in each cluster to coordinate the scaling across the clusters of resources when there is need. For example, the global auto-scaler may receive a request from a local auto-scaler and may then perform an autoscaling operation. Each local auto-scaler is responsible for the scaling in each cluster and may request the global auto-scaler to perform global autoscaling if needed, e.g., when a local limitation of resources has been reached. The load balancer may be used to provide information to the global auto-scaler and may also modify its global redirection policy according to an instruction from the global auto-scaler as a result of the global scaling. Embodiments herein provide an efficient solution for global horizontal autoscaling across multiple clouds comprising one or more clusters of resources.

BRIEF DESCRIPTION OF THE DRAWINGS

Embodiments will now be described in more detail in relation to the enclosed drawings, in which.

DETAILED DESCRIPTION

Figure 1:
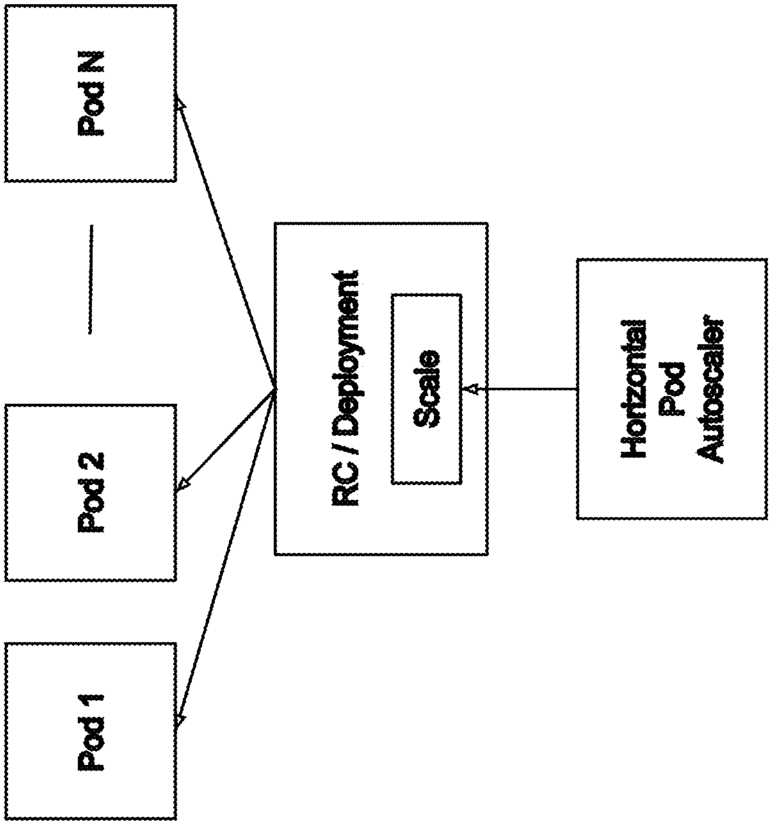
Fig. 1 PRIOR ART
FIG. 1 shows a horizontal pod auto-scaler according to prior art.
Figure 2:
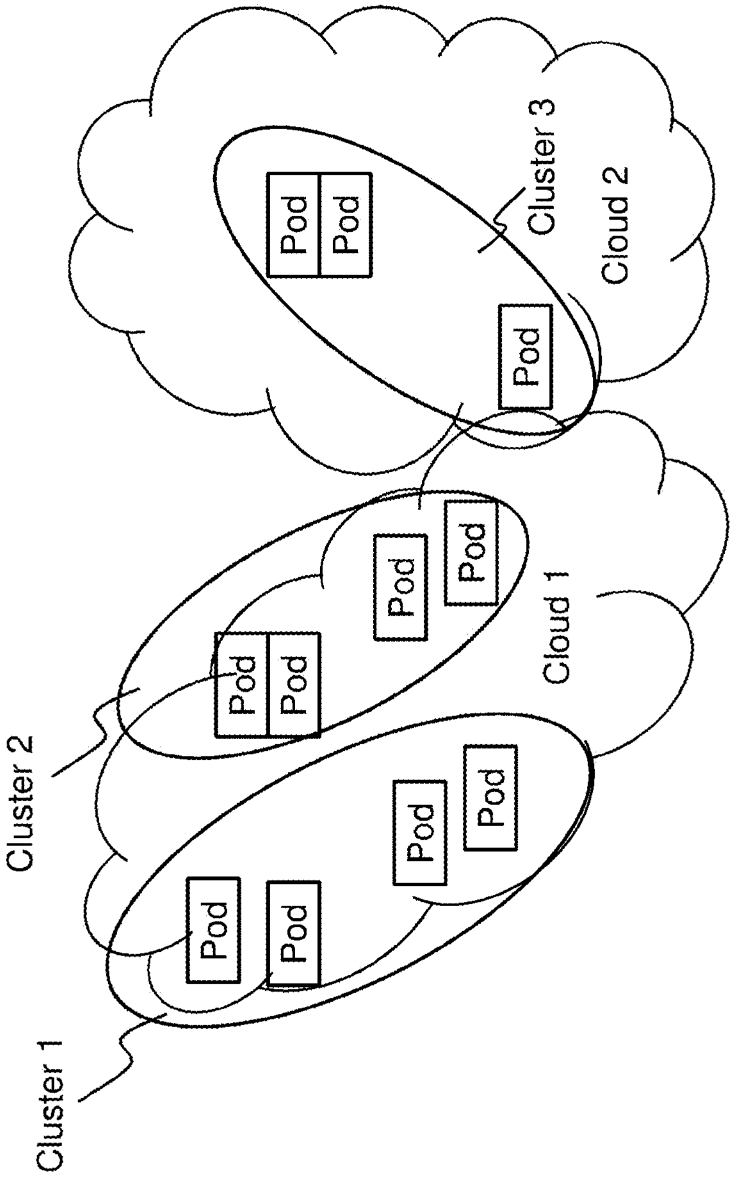
FIG. 2 shows a communication network using resources in a multi cluster and multi cloud scenario.
Figure 3:
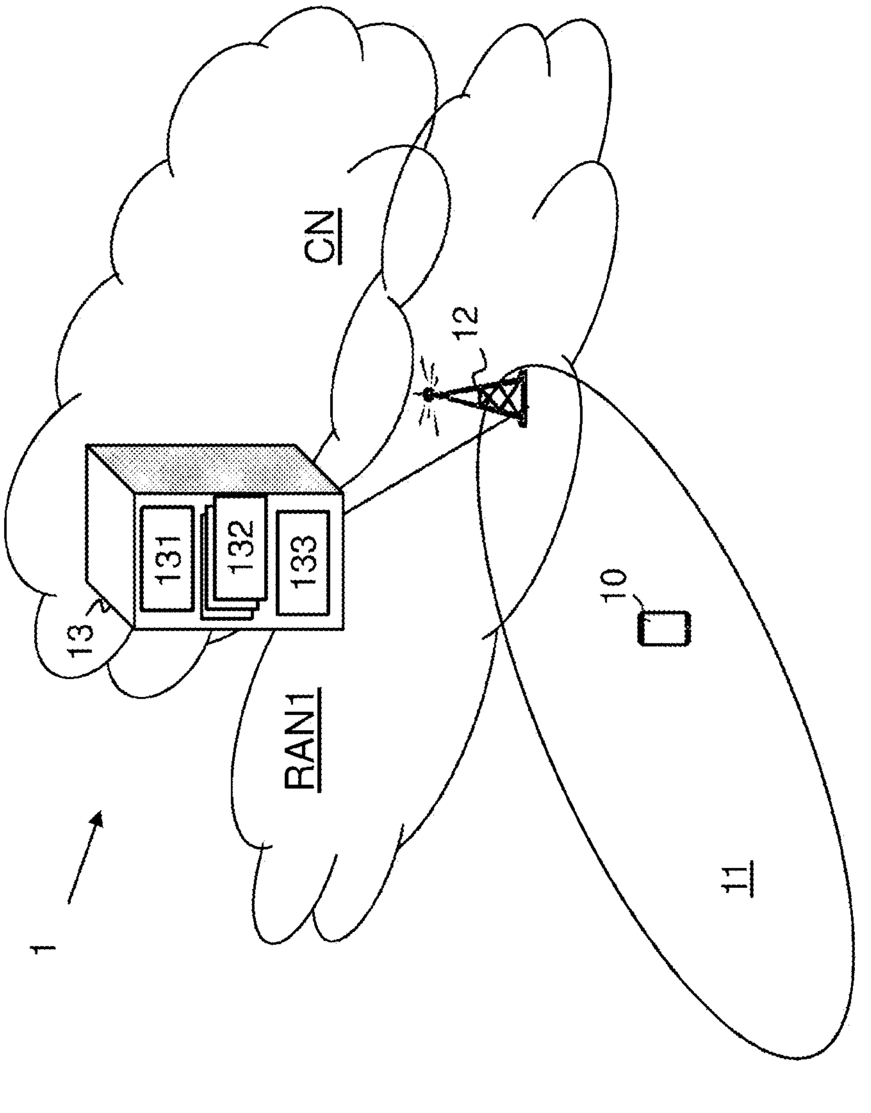
FIG. 3 shows a communication network according to embodiments herein.

Embodiments herein relate to communication networks in general. FIG. 3 is a schematic overview depicting a communication network 1 associated with a multiple cloud infrastructure. The communication network 1 comprises one or more access networks, such as radio access networks (RAN) e.g. a first RAN (RAN1), connected to one or more core networks (CN). The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, user equipments (UE) e.g. a UE 10 such as a mobile station, a non-access point (non-AP) station (STA), a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things (IoT) operable device, Device to Device (D2D) terminal, mobile device e.g. smart phone, laptop, mobile phone, sensor, relay, mobile tablets or any device communicating within a cell or service area.

The communication network 1 comprises a radio network node 12 providing radio coverage over a geographical area, a service area 11 or a cell, of a first radio access technology (RAT), such as New Radio (NR), LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the radio network node 12 depending e.g. on the first radio access technology and terminology used.

The communication network 1 further comprises a scaling arrangement 13, such as one or more network nodes, for example, a RAN node and/or a core network node, handling cloud computing for providing resources for applications and/or services in the communication network. The scaling arrangement 13 may be a standalone server, a cloud-implemented server, a distributed server or as processing resources in a server farm.

It is herein provided a hybrid horizontal autoscaling mechanism which provides an efficient global horizontal autoscaling across clusters of resources in a multi-cloud environment. The global scaling is provided by the scaling arrangement 13 and achieved through the cooperation and interaction between: a global auto-scaler 131; and one or more local auto-scalers 132, one for each cluster of resources. The scaling arrangement 13 may further comprise or be in contact with a load balancer 133 of the multi-cloud platform.

The global auto-scaler 131 may automatically create and initiate the local auto-scalers 132 according to a global configuration and other related information. The global auto-scaler 131 may also dynamically modify the configuration of one or more local auto-scalers 132 based on, for example, collected performance metric, information provided by the global load balancer 133, and other related information.

Different from the common horizontal autoscaling within a single cluster, e.g., Kubernetes Horizontal Pod Auto-Scaler, embodiments herein provide the local auto-scalers 132 that are extended to support global scaling, for example, one local auto-scaler 132 may request the global auto-scaler 131 to perform global scaling when there is need, e.g., when local scaling is impossible to success due to shortage of resources or similar. The global scaling is managed by the global auto-scaler 131 and may be performed in several ways, for example, distributing requested horizontal scaling, i.e., the change of number of replicate pods, from one particular local auto-scaler to one or more selected clusters of resources, managed by other local auto-scalers 132, among the multiple clouds; or modifying the configuration and/or parameters of one or more local auto-scalers 132.

The multiple clusters of resources can be grouped according to related parameters or desired policies so that the global scaling can be optimized, for example, the distribution of the scaling is only for those clusters of resources which have similar cost, or geographic proximity.

Comparing with the common local horizontal autoscaling, embodiments herein provide a global level horizontal autoscaling which provide better high availability, higher flexibility of resource utilization because the scaling is performed across the resources provided by the multiple clouds comprising one or more clusters of resources.

Figure 4:
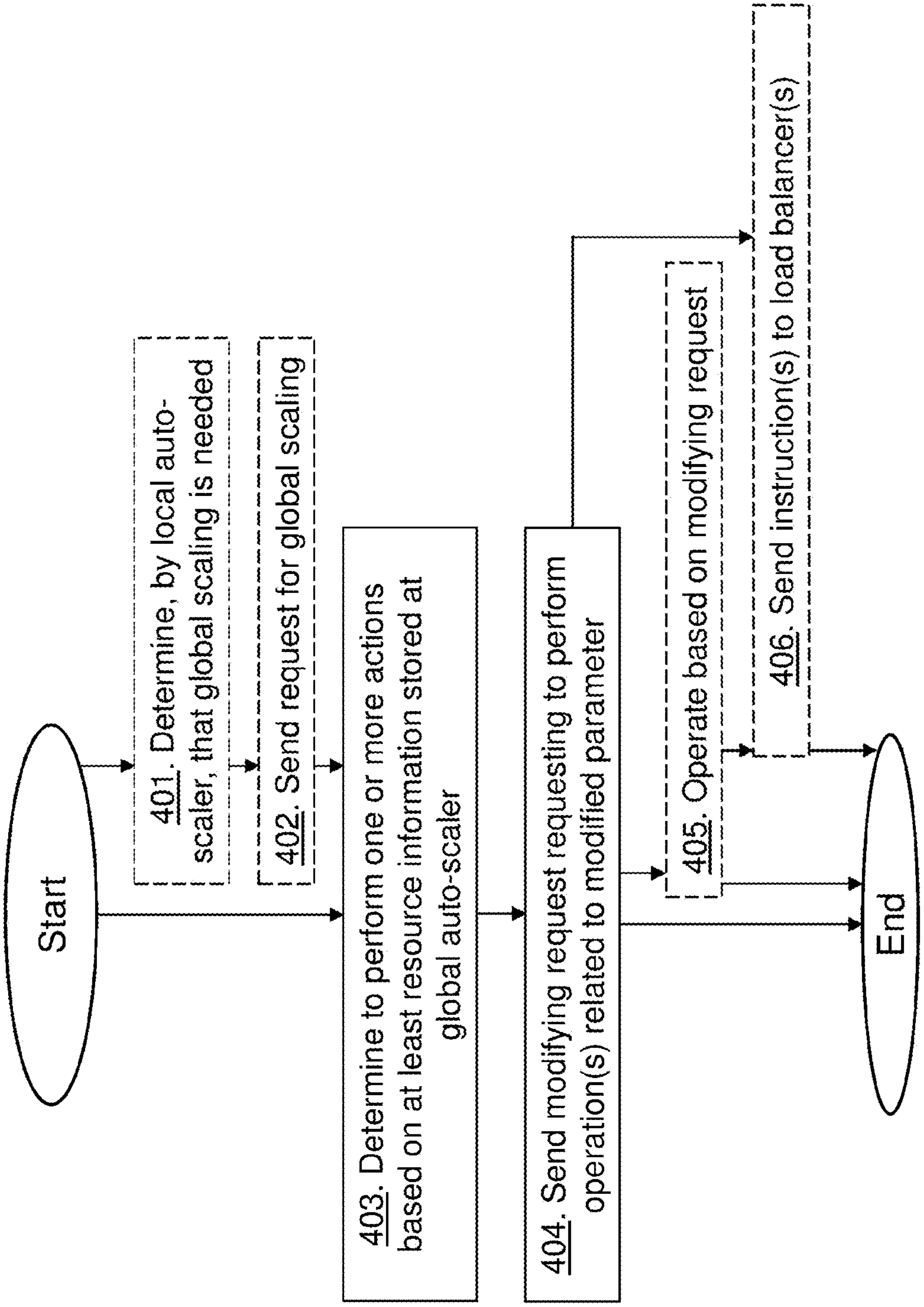
FIG. 4 shows a flowchart depicting a method performed by a scaling arrangement according to embodiments herein.

The method actions performed by the scaling arrangement 12 for managing resources in the communication network associated with the multiple cloud infrastructure according to embodiments herein will now be described with reference to a flowchart depicted in FIG. 4. The actions do not have to be taken in the order stated below, but may be taken in any suitable order. Actions performed in some embodiments are marked with dashed boxes. The scaling arrangement comprises at least the global auto-scaler 131 and one or more local auto-scalers 132.

Action 401. The scaling arrangement 13 may determine, by a local auto-scaler out of the one or more local auto-scalers 132 managing a local cluster of resources, that global scaling of resources is needed for the local cluster of resources.

Action 402. The scaling arrangement 13 may then further send, by the local auto-scaler, a request to the global auto-scaler 131, requesting for global scaling. The request to the global auto-scaler 131 may indicate a cluster identity (ID), a type of the scaling, and/or a desired amount or number of resources.

Action 403. The scaling arrangement 13 determines, at the global auto-scaler 131 of the scaling arrangement 13, to perform one or more actions based on at least resource information stored at the global auto-scaler 131, wherein the resource information is associated with resources structured in multiple clouds comprising one or more local clusters of resources. The resources may comprise processing capacity, memory capacity, nodes, pods or similar. The one or more actions comprise modifying a parameter related to at least one of the resources of the multiple clouds. Modifying the parameter may comprise modifying, add or remove, a number of resources of the multiple clouds, and/or comprise creating an autoscaling rule and/or parameter for the at least one local auto-scaler out of the one or more local auto-scalers. The number of resources may be one or more resources such as pods or similar. The resource information stored at the global auto-scaler may comprise one or more global performance metrics. The one or more actions to be performed may be determined based on the request from the local auto-scaler, see action 402, and the resource information stored at the global auto-scaler. The resource information stored at the global auto-scaler may comprise one or more of: global scaling policy and parameter; geographic information; statistical performance metrics from one or more clusters of respective cloud; and data collected from one or more load balancers 133. The determination may be performed periodically and comprise checking the one or more global performance metrics provided from one or more local clusters of resources of respective cloud and, based on the checked one or more global performance metrics, evaluating if a global scaling is needed.

Action 404. The scaling arrangement 13 sends a modifying request to at least one (one or more) local auto-scaler 132 out of the one or more local auto-scalers, requesting to perform one or more operations related to the modified parameter. The modifying request may request to add and/or remove a resource, and/or request to use the created autoscaling rule and/or parameter. The modifying request may be sent to the local auto-scaler requesting for global scaling, or another local auto-scaler.

Action 405. The scaling arrangement 13 may then, at the at least one local auto-scaler perform an operation based on the modifying request. The local auto-scaler may for example add and/or remove the resource, and/or use the created autoscaling rule and/or parameter indicated in the modifying request. For example, the modifying request may indicate modification of maximum number of the replicate pods, and/or a desired performance metric for the local auto-scaler. The local auto-scaler may then set up operation with the modified maximum number of the replicate pods, and/or the desired performance metric.

Action 406. The scaling arrangement 13 may further send one or more instructions to the one or more load balancers 133, wherein the one or more instructions are related to the created autoscaling rule and/or parameter; and/or the modified number of resources. The one or more instructions may indicate a redirection of requests from one or more user equipments in the communication network.

The global scaling is performed in a hybrid mode, which consists of the central global auto-scaler 131 and the local auto-scaler 132 handling each cluster. It provides better scalability and availability, especially, when there are lots of managed clusters while at the same time providing managed and coordinated global scaling.

The global scaling may be coordinated with the load balancer 133 so that the change of the allocated resource for each cluster can be synchronized with the actual traffic workload managed by the load balancer 133.

The global scaling is flexible because the scaling can not only change the number of the total replicate pods but also can modify the resource distribution across the multiple clusters by changing the configuration of the local auto-scaler 132.

Figure 5:
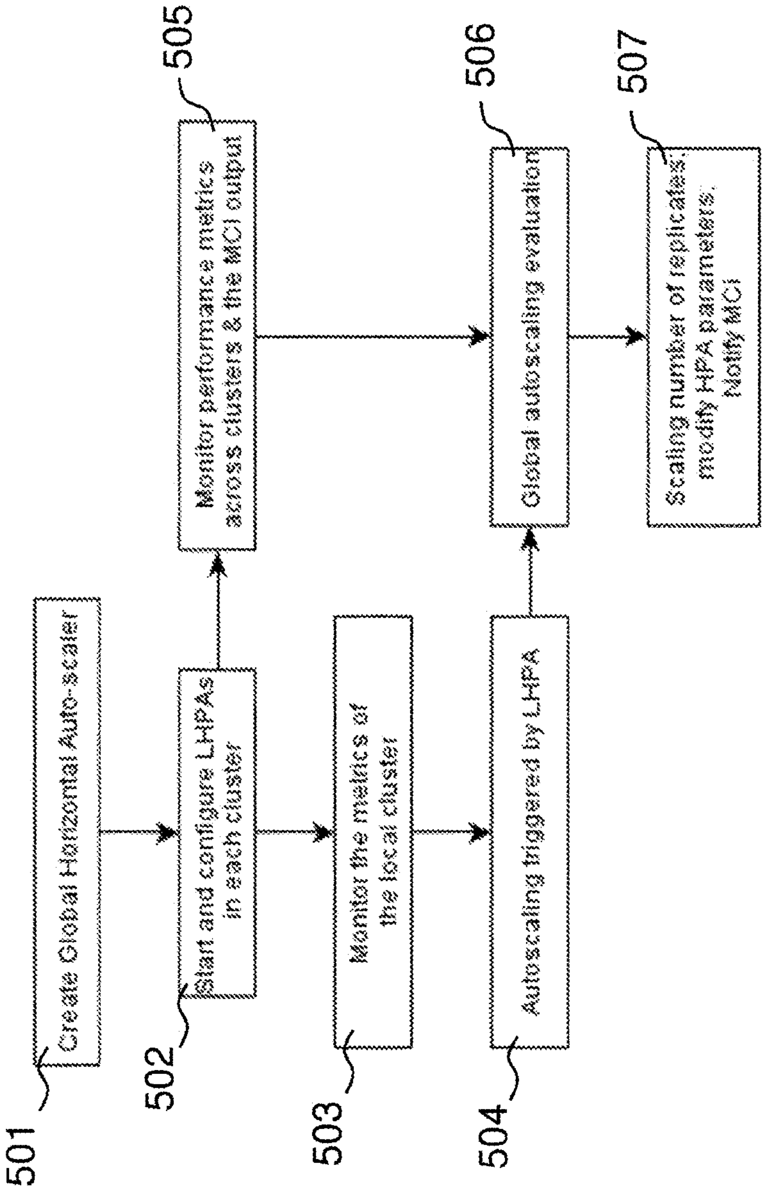
FIG. 5 shows a schematic overview depicting a method performed by a scaling arrangement according to some embodiments herein.

A high-level overview of the method is shown in FIG. 5 and described as below:

Action 501. The application provider or other entity may create the global auto-scaler such as a GHA for the deployed service or services and may configure one or more global scaling rules and/or parameters such as CPU usage, maximum number of pods or the like.

Action 502. The GHA may start and configure one or more local auto-scalers such as respective LHPA in each of the managed clusters accordingly, for example, based on the configured one or more global scaling rules and/or parameters.

Action 503. Respective LHPA may monitor the related performance metrics, such as processing capacity, time to perform an operation, or similar, in each cluster of resources. When a scaling operation is triggered, for example, based on one or more local scaling rules and parameters; the local auto-scaler may determine if further global scaling is required Action 504. The LHPA may trigger global scaling if considered required in action 503. For example, the LHPA may request a global scaling from the GHA.

Action 505. Alternatively, or additionally, the GHA may periodically check the global performance metrics provided by each cluster or the load balancer 133, such as an MCI. Some scaling rules can be predefined to indicate when a global scaling is required. For example, if the average performance metrics of the pods across multiple clusters exceeds a predefined threshold, or when there is performance imbalance among the multi-clusters.

Action 506. The GHA may then evaluate if global scaling is needed, for example, based on the request coming from the LHPA, and/or the checked global performance metrics.

Action 507. The GHA may then create scaling instructions if the GHA has determined a global autoscaling is required. The scaling instructions may have different actions: changing the number of replicate pods in the specified clusters; modifying the configuration or parameters of the LHPA; and/or Notifying MCI to change traffic redirection rule.

Figure 6:
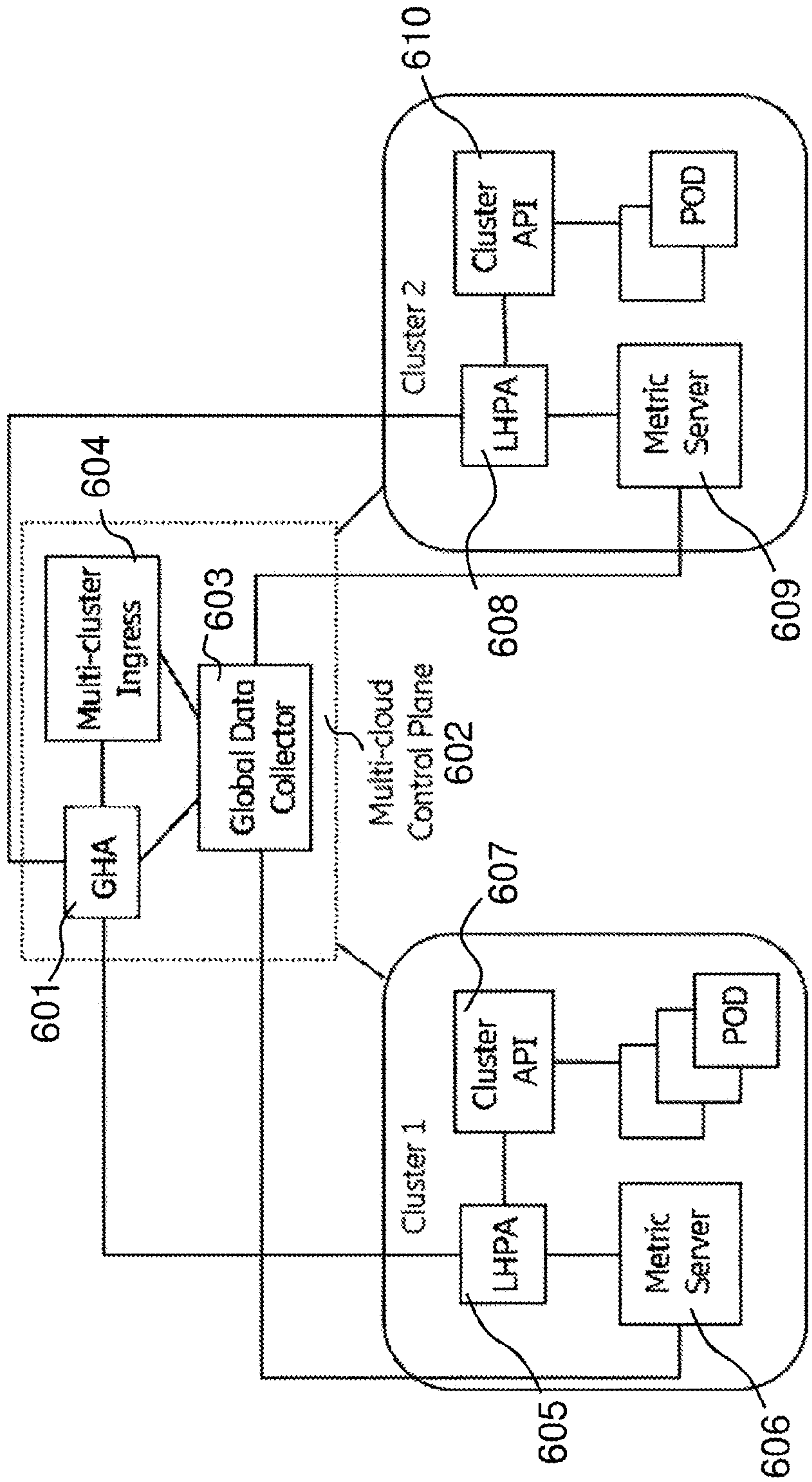
FIG. 6 shows an implementation of embodiments herein into a Kubernetes based multi-cloud system.

As shown in FIG. 6, for a Kubernetes based multi-cloud system, the proposed system mainly consists of a central Global Horizontal Auto-scaler (GHA) 601, a Multi-cloud Control Plane (MCP) 602, a Global Data Collector (GDC) 603, a Multi-cluster Ingress (MCI) 604, and a respective Local Horizontal Pod Auto-scaler (LHPA) 605,608. Each cloud may comprise one or more clusters of for example pods. In each cluster, there are also other common functions for the clusters, for example, a Metric Server 606,609 which metric servers collect relevant performance metrics utilized by the LHPA for the autoscaling; a respective Cluster API 607,610 is a native API to manage the pods or containers of pods in the cluster, i.e., to deploy service, add/remove a pod and/or a container.

The MCP 602 is the control plane function to manage and control the clusters from the multiple cloud, e.g., the Google Anthos. It may be located in one cluster in the multi-cloud system and may provide interfaces to the user to manage the clusters belonging to these multiple clouds. The MCI 604 may be part of the MCP 602 in order to provide the ingress function to redirect the request coming from the users to the multiple clouds managed by the MCP 602. The MCP 602 may also have access to the information of the clusters, for example, the cluster ID, the location, pricing, etc. Such information can be stored in the GDC 603 and be shared with the GHA 601.

The GHA 601 is the central entity to manage the global autoscaling across the multiple clouds, for example, creating and coordinating the autoscaling rules and parameters for the LHPAs 605,608 in each cloud dynamically according to the information stored in GDC 603. It may interact with the MCI 604 and LHPAs 605,608 to perform the global autoscaling. The GHA 601 may be part of the MCP 602 or be independent with MCP 602.

The LHPAs 605,608 are responsible for the local horizontal autoscaling in each cluster according to the scaling rules and parameters configured by the GHA 601. Its function is similar to that of the normal HPA for a single cluster, but is extended to support the global autoscaling. The Kubernetes' HPA may be used as an example of an auto-scaler, but another horizontal auto-scaler may be used as well.

The main function of the MCI 604 is to route one or more requests coming from the end users to the most suitable microservice instances, e.g., pods, deployed at different clusters. Sometimes, the MCI 604 is also called the load balancer. There are multiple ways to implement such routing or forwarding, for example, IP anycast, HTTP redirection, DNS based, etc. Besides the normal routing function, the MCI 604 may record its previous routing behavior and store the statistics, e.g., an average value in a specified time slot, into the GDC 603. For example, a ratio or a throughput of the request being directed to each cluster; also information related to the requests may be stored, like the geographic location of the source, or the IP subnet of the source, etc.

The GDC 603 may collect and store these relevant data from each cluster in the multi-cloud environment, provide the interface for other components to access the stored data. Such data can include but not limited to: the cluster information, e.g., ID, location, pricing; aggregated performance metrics collected from the metric server 606,609 in each cluster; the information recorded by the MCI 604, etc.

Initiation of LHPA Rules and Parameters

If the application provider wants to enable global horizontal autoscaling for the deployed service in the multi-cloud, it is needed to provide the global autoscaling rules and related parameters, for example, the maximum/minimum number of the pods that can be deployed across the multiple clouds, the performance metrics (e.g., CPU usage, request throughput) that are to be used to trigger the pod scaling. See action 502. The application provider can also specify a set of clusters (Scaling Group) that will be the part of the global autoscaling. If it isn't specified, then it is assumed all clusters in the clouds managed by the MCP 602 will participate the Scaling Group.

The GHA 601 may also manually or automatically create a sub group of the clusters among the Scaling Group according to given policies. For example, the clusters that are close to each other or have other similar properties. Such a group may be denoted as a Prioritized Group, in which the clusters have higher priority to be selected when cross-cluster autoscaling coordination is instructed by the GHA 601.

Suppose the application provider has created a GHA 601 for the deployed microservice (MSa). As an example, in this GHA, the standard Kubernetes HPA rule is used, i.e., the basic algorithm of Kubernetes HPA is adopted:

$$\text{desiredReplicas}=\text{ceil}[\text{currentReplicas}*(\text{currentMetricValue}/\text{desiredMetricValue})] \quad (1)$$

As an example, the CPU usage percentage is selected as the metric in the rule. The application provider needs to configure the global desiredMetricValue, i.e., the desired CPU usage (g_dm=70%), and the minimum (g_min=2) and maximum number (g_max=10) of the total pods which can be deployed across the Scaling Group.

The GHA 601 may then ask the MCP 602 to create a LHPA 605,608 in each cluster in the Scaling Group for the microservice (MSa), and may generate the corresponding configuration (including rules and the initial parameters) for these LHPAs accordingly. Example of action 502. For example, there are two clusters (cluster1 and cluster2) that are in the Scaling Group. For cluster i, let $dm_i$ denote the desired metric value, i.e., the desired CPU usage, $min_i$ denote the minimum pod number, $max_i$ denote the maximal pod number. There are many ways to determine the initial parameters for each LHPA, for example, to distribute the $min_i/max_i$ equally among the clusters of the Scaling Group, i.e., $min_1=min_2=g\_min/2=1$, $max_1=max_2=g\_max/2=5$, and set the desired metrics value to the same as of the GHA, i.e., $dm_1=dm_2=g\_dm=70\%$. It is also possible the determine these values according to other information, for example $max_1=3$, $max_2=7$ if the pricing for cluster2 is cheaper than cluster1.

Note: these values may be modified dynamically by the GHA 601 later in order to adjust the scaling behavior.

Update of LHPA Rules and Parameters

The parameters of the scaling rule for each LHPA 605,608 may be adjusted by the GHA 601 periodically or trigged by the requests coming from the LHPAs, e.g., when the LHPA ask for global scaling if it cannot handle the scaling in its cluster according to the local configuration. See Action 504.

The GHA 601 may periodically check the information stored in the GDC 603, for example, the interested performance metrics like Pods' average CPU usage from each cluster, the request throughput toward each cluster monitored by the MCI 604, etc., and then modify the parameters of LHPA accordingly. See Action 505.

Below is a simple example algorithm for setting LHPA parameters ($min_i$, $max_i$, $dm_i$, i.e., desired CPU usage) according to the measured average request throughput and average CPU usages in a given interval, other advanced algorithms may also be applied:

Let $t_i$ denote the throughput of the request be routed to the replicate pods in cluster i by the MCI 604, T denote the total throughput of the request to the replicate pods in the clusters of the Scaling Group, and $cpu_i$ denote the average CPU usage of all replicate pods of the given pod in cluster i. and g_cpu represent the average CPU usage of all replicate pods of the pod in the scaling group.

$$max_i=[t_i/T*g\_max] \text{ and } dm_i=cpu_i/g\_cpu*g\_dm \quad (2)$$

Coordinated Global Horizontal Scaling

In each cluster, the LHPA 605,608 will periodically check the observed metrics (e.g., CPU) provided by the metric server 606,609 or other component to see if there is a need to adjust the number of the replicate pods of the deployed microservice according to the rule and parameters given by GHA 601. See action 503.

Figure 7:
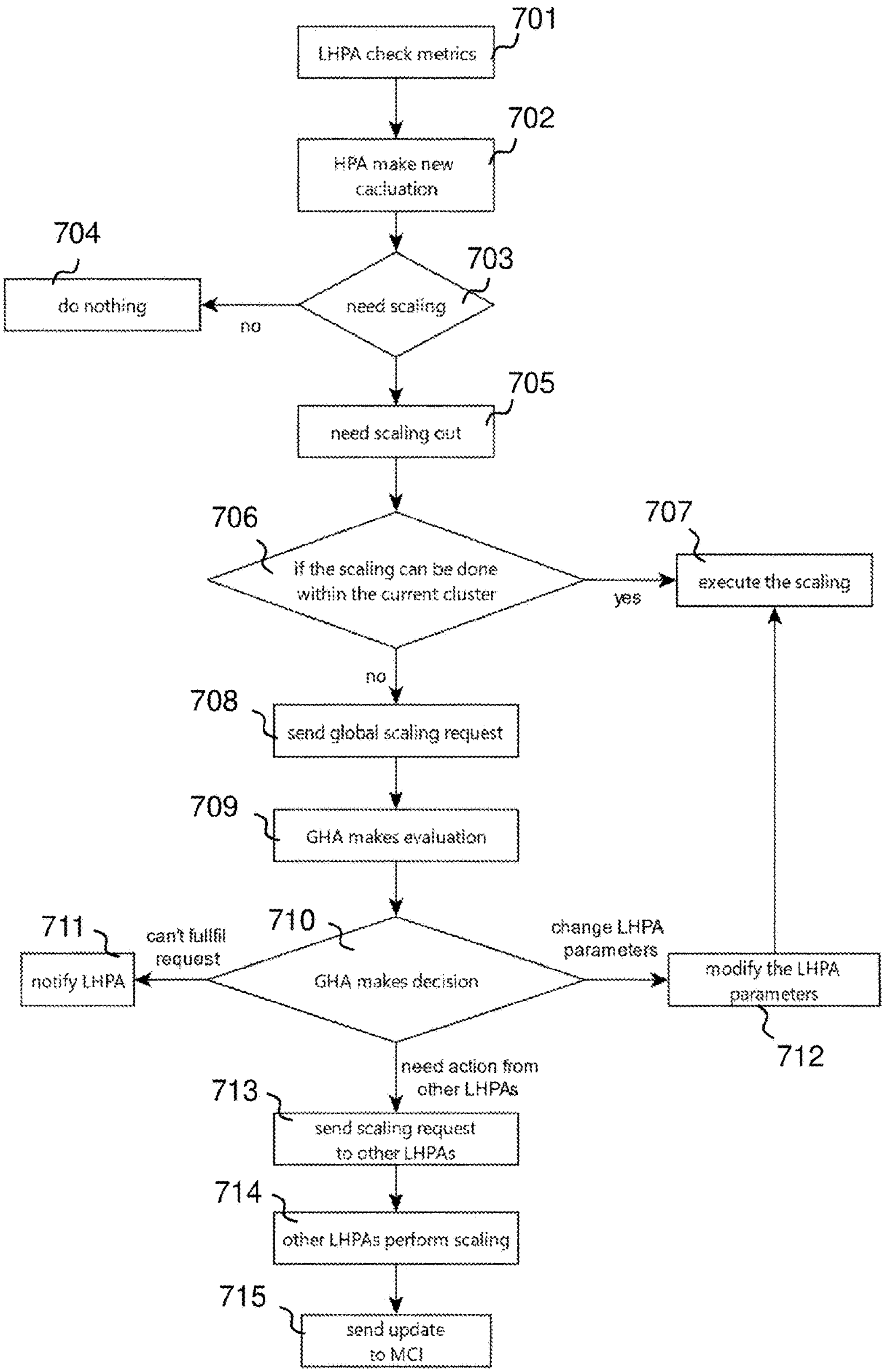
FIG. 7 shows a schematic overview depicting a method performed by the scaling arrangement according to some embodiments herein.

Process flow of some embodiments herein for the global scaling in the GHA 601 is shown in FIG. 7.

Action 701. The LHPA of cluster i ($LHPA_i$) periodically query the metric server to get the performance metrics specified in the rule, e.g., the average CPU usage of all pods for the given microservice in this example.

Action 702. Based on the designated algorithm 1, it's possible to use other algorithms, $LHPA_i$ calculates the desired number of the pods in cluster i, denoted as $dn_i$, and compares to the current number of the pods ($cn_i$) and gets the difference of the pod number ($nn_i$).

Action 703. If $nn_i$ is greater than zero, it means a scaling out is needed referred to as scale out, otherwise, if $nn_i$ is less than zero, it means a scaling in is needed, referred to as scale in.

Action 704. If $nn_i$ is zero, means there is no need to perform scaling at this moment.

Action 705. In this example, scaling out is needed.

Action 706. If it is scaling out, $LHPA_i$ will check if it is possible to do it within the current cluster, i.e., to check if $nn_i <= max_i - cn_i$, which means that the number of pods after the scaling will not exceed the parameter $max_i$., i.e., maximum number of pods of the cluster.

Action 707. If yes, then $LHPA_i$ will request the Cluster API to execute the scaling accordingly.

Action 708. If $nn_i > max_i - cn_i$, which means that according to the current configuration, the LHPA can't fulfill the scaling, LHPA may then send a request to the GHA 601 to ask for coordinated scaling, which can mean the scaling out is done together with other selected clusters, i.e., some new pods will be deployed in other clusters; or some scaling parameters, e.g., desired CPU usage, maximum number of pods, will be changed by the GHA 601 for the LHPA so that the scaling can still be fulfilled by the current cluster.

Action 709. After receiving the scaling request which may include the cluster ID, the type of the scaling, scale in or scale out, the desired new number of the pods, etc., the GHA 601 will evaluate the scaling.

Action 710. The GHA 601 may check the related information, i.e., the global scaling policy and parameters, geographic information, the data stored in the GDC, e.g., the statistical performance metrics from the clusters in the scaling group and data collected from the MCI, and may make the scaling decision.

There could be several types of decision:

Action 711. The scaling request can't be fulfilled by the GHA 601. In this case, the GHA 601 may send a response to indicate the requesting LHPA; the scaling cannot be fulfilled. Then LHPA; can either just do nothing or partially satisfy the scaling request, e.g., to just deploy part of the new pod number calculated by it. GHA 601 may also notify application providers that horizontal scaling couldn't be done.

Action 712. The scaling request can be performed by the current LHPA but its parameters need be adjusted. In this case, the GHA 601 may decide that some parameters of the current LHPA can be modified so that the scaling request can still be fulfilled by the current cluster. For example, the GHA 601 may modify the maximum number of the pods, or the desired performance metric for that LHPA. The GHA 601 may also modify the parameters of the LHPAs in other clusters to conform to the global scaling rule and parameters. The similar algorithm as describe above eq. (2) can be used here.

Action 713. The scaling request can be performed together with the LHPAs from other clusters. In this case, the GHA 601 may determine how to distribute the requested new replicate pods into the clusters in the scaling group according to predefined policies, for example, according to the proximity the clusters, or the resource usage of the clusters in the scaling group. An example distribution could look like: (cluster2: 3) which means the cluster2 shall deploy 3 new replicate pods. As mentioned above, the GHA 601 can setup a Priority Group and could only take the clusters in this Priority Group into consideration firstly, and if the new required numbers can't be satisfied in the group, the GHA 601 could consider all clusters in this Scaling Group. After the distribution is calculated, the GHA 601 may send the scaling instruction to the LHPAs of the corresponding clusters.

Action 714. The LHPAs may then perform the requested scaling.

Action 715. The GHA 601 may also notify the MCI 604 to modify the redirection policy, for example, if the request redirection is based on the proximity between the end user and the serving cluster, i.e., the request will be send the replicate pods in the cluster that is closest to the end user, the MCI 604 may route some end user request previously targeting the current cluster (cluster1) to other clusters (e.g., cluster2) that have been instructed to deploy new replicate pod(s). One reason is that if other clusters have created more replicate pods but still have the same throughput of the request, the measured CPU usage will decrease which will in turn trigger a scale in. Therefore, it may cause frequent change of scale-in and scale-out and instability of the system.

Figure 8:
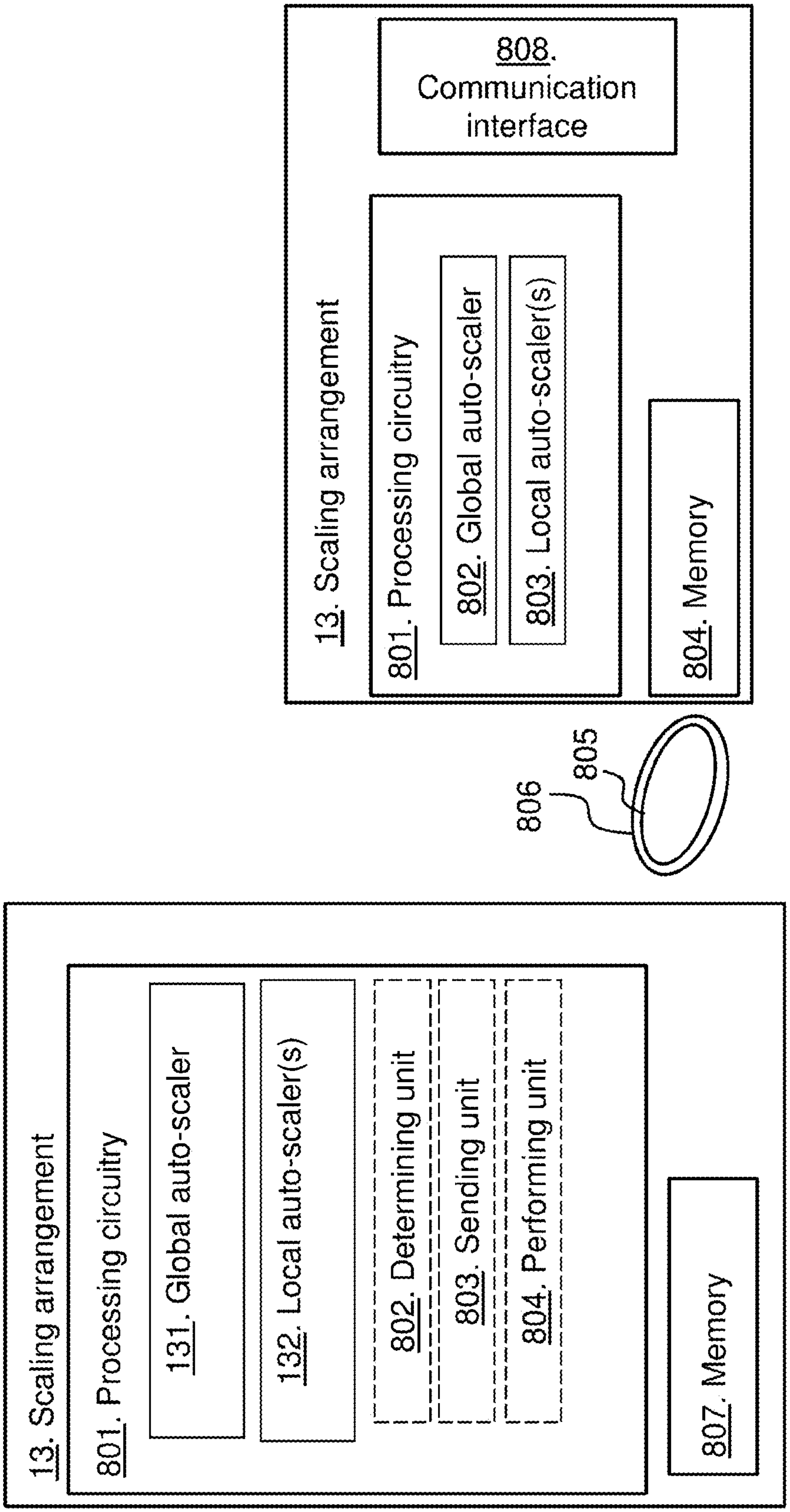
FIG. 8 shows a block diagram depicting scaling arrangements according to embodiments herein.

FIG. 8 is a block diagram depicting the scaling arrangement 13 for managing resources in the communication network associated with a multiple cloud infrastructure. The scaling arrangement comprises the global auto-scaler 131 and the one or more local auto-scalers 132. The scaling arrangement 13 may further comprise the load balancer or be connected with the load balancer.

The scaling arrangement 13 may comprise processing circuitry 801, such as one or more processors, configured to perform methods herein. The processing circuitry may be arranged in one stand-alone unit or be distributed among a number of servers or units.

The scaling arrangement 13 may comprise a determining unit 802. The scaling arrangement 13, the processing circuitry 801, and/or the determining unit 802 is configured to determine, at the global auto-scaler 131 of the scaling arrangement 13, to perform the one or more actions based on at least the resource information stored at the global auto-scaler 131. The resource information is associated with the resources structured in multiple clouds comprising one or more local clusters of resources, e.g., pods or the like. The one or more actions comprise modifying the parameter related to the at least one of the resources of the multiple clouds, e.g., adding or removing pods of local cluster of resources. The one or more actions may comprise modifying a number of resources, i.e., one or more resources, of the multiple clouds comprising the one or more local clusters of resources, and/or by creating an autoscaling rule and/or parameter for at least one local auto-scaler out of the one or more local auto-scalers. The resource information may comprise one or more global performance metrics and the scaling arrangement 13, the processing circuitry 801, and/or the determining unit 802 may be configured to perform the determination periodically and to check the one or more global performance metrics provided from one or more local clusters of resources of respective cloud, and based on the checked one or more global performance metrics evaluate if a global scaling is needed. The resource information may comprise one or more of: global scaling policy and parameter; geographic information; statistical performance metrics from one or more local clusters of respective cloud; and data collected from the one or more load balancers.

The scaling arrangement 13 may comprise a sending unit 803, e.g., a transmitter and/or transceiver. The scaling arrangement 13, the processing circuitry 801, and/or the sending unit 803 is configured to send the modifying request to at least one local auto-scaler out of the one or more local auto-scalers, requesting to perform the one or more operations related to the modified parameter. The modifying request may request to add and/or remove a resource, and/or request to use the created autoscaling rule and/or parameter. The scaling arrangement 13, the processing circuitry 801, and/or the sending unit 803 may be configured to send the modifying request to the local auto-scaler requesting for global scaling and/or another local auto-scaler. The scaling arrangement 13, the processing circuitry 801, and/or the sending unit 803 may be configured to send the one or more instructions to the one or more load balancers, wherein the one or more instructions are related to the created autoscaling rule and/or parameter; and/or the modified number of resources. The instruction may indicate a redirection of requests from one or more user equipments in the communication network.

The scaling arrangement 13, the processing circuitry 801, and/or the determining unit 802 may be configured to determine by a local auto-scaler out of the one or more local auto-scalers 132 managing a local cluster of resources, that global scaling of resources is needed for the local cluster of resources. The scaling arrangement 13, the processing circuitry 801, and/or the sending unit 803 may then be configured to send by the local auto-scaler 132, the request to the global auto-scaler 131, requesting for global scaling. The scaling arrangement 13, the processing circuitry 801, and/or the determining unit 802 may then further be configured to determine the one or more actions to be performed based on the request and the resource information stored at the global auto-scaler. The request to the global auto-scaler may indicates the cluster ID, the type of the scaling, e.g., scale in or out, and/or the desired amount or number of resources, e.g., pods.

The scaling arrangement 13 may comprise a performing unit 804. The scaling arrangement 13, the processing circuitry 801, and/or the performing unit 804 may be configured to perform, at the at least one local auto-scaler, the operation based on the modifying request. For example, the local auto-scaler 132 may add or remove pods as indicated in the modifying request.

The scaling arrangement 13 comprises a memory 807. The memory 807 comprises one or more units to be used to store data on, such as indications, requests, actions, resource information, data related to nodes, and applications to perform the methods disclosed herein when being executed, and similar. Thus, embodiments herein may disclose a scaling arrangement for managing resources in the communication network, wherein the scaling arrangement comprises processing circuitry and a memory, said memory comprising instructions executable by said processing circuitry whereby said scaling arrangement is operative to perform any of the methods herein. Furthermore, the scaling arrangement 13 may comprise a communication interface 808 comprising, e.g., a transmitter, a receiver and/or a transceiver.

The methods according to the embodiments described herein for the scaling arrangement 13 are respectively implemented by means of e.g. a computer program product 805 or a computer program, comprising instructions, i.e., software code portions, which, when executed on at least one processor, cause the at least one processor to carry out the actions described herein, as performed by the scaling arrangement 13. The computer program product 805 may be stored on a computer-readable storage medium 806, e.g., a disc, a universal serial bus (USB) stick or similar. The computer-readable storage medium 806, having stored thereon the computer program product, may comprise the instructions which, when executed on at least one processor, cause the at least one processor to carry out the actions described herein, as performed by the scaling arrangement. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or UE, for example.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a scaling arrangement for managing resources in a communication network associated with a multiple cloud infrastructure, wherein the scaling arrangement comprises a global auto-scaler and one or more local auto-scalers, the method comprising:

creating and initiating, by the global auto-scaler, the one or more local auto-scalers in each of the multiple clouds according to global configuration information including global scaling rules and parameters, wherein each local auto-scaler is responsible for local horizontal autoscaling within its respective cluster and is extended to request the global auto-scaler to perform global scaling when local scaling cannot be fulfilled;

dynamically modifying, by the global auto-scaler, configuration of the one or more local auto-scalers based on collected performance metrics and information provided by one or more load balancers;

determining, at the global auto-scaler of the scaling arrangement, to perform one or more actions based on at least resource information stored at the global auto-scaler; wherein the resource information is associated with resources structured in multiple clouds comprising one or more local clusters of resources; and wherein the one or more actions comprise modifying a parameter related to at least one of the resources of the multiple clouds; and sending a modifying request to at least one local auto-scaler out of the one or more local auto-scalers, requesting to perform one or more operations related to the modified parameter.

2. The method according to claim 1, wherein modifying the parameter comprises at least one of:

modifying a number of resources of the multiple clouds;

creating an autoscaling rule for the at least one local auto-scaler out of the one or more local auto-scalers; and creating a parameter for the at least one local auto-scaler out of the one or more local auto-scalers.

3. The method according to claim 2, wherein the modifying request requests at least one of:

adding a resource;

removing the resource; and using at least one of the created autoscaling rule and parameter.

4. The method according to claim 2, further comprising:

sending one or more instructions to the one or more load balancers, wherein the one or more instructions are related to at least one of:

the created autoscaling rule, the created parameter, and the modified number of resources, wherein the one or more instructions to the one or more load balancers comprise instructions to modify a traffic redirection policy based on the modified number of resources, wherein the modified traffic redirection policy routes user equipment requests to clusters where new resources have been deployed to prevent performance imbalance.

5. The method according to claim 4, wherein the one or more instructions indicate a redirection of requests from one or more user equipments in the communication network.

6. The method according to claim 1, wherein the resource information comprises one or more global performance metrics and the determination is performed periodically and comprises checking the one or more global performance metrics provided from one or more local clusters of resources of respective cloud and based on the checked one or more global performance metrics evaluating if a global scaling is needed.

7. The method according to claim 1, further comprising:

determining, by a local auto-scaler of the one or more local auto-scalers managing a local cluster of resources, that global scaling of resources is needed for the local cluster of resources; and sending, by the local auto-scaler, a request to the global auto-scaler, requesting for global scaling; and wherein the one or more actions to be performed are determined based on the request and the resource information stored at the global auto-scaler.

8. The method according to claim 7, wherein the request to the global auto-scaler indicates at least one of a cluster identity, ID, a type of the scaling, and a desired amount of resources.

9. The method according to claim 1, wherein the resource information comprises one or more of: global scaling policy and parameter; geographic information; statistical performance metrics from one or more local clusters of respective cloud; and data collected from one or more load balancers.

10. The method according to claim 1, further comprising performing at the at least one local auto-scaler, an operation based on the modifying request.

11. A non-transitory computer-readable storage medium, having stored thereon a computer program product comprising instructions which, when executed on at least one processor, cause the at least one processor to carry out the methods according to claim 1, as performed by the scaling arrangement.

12. A scaling arrangement for managing resources in a communication network associated with a multiple cloud infrastructure, wherein the scaling arrangement comprises a global auto-scaler and one or more local auto-scalers, and processing circuitry, wherein the processing circuitry is configured to:

create and initiate, by the global auto-scaler, the one or more local auto-scalers in each of the multiple clouds according to global configuration information including global scaling rules and parameters, wherein each local auto-scaler is responsible for local horizontal autoscaling within its respective cluster and is extended to request the global auto-scaler to perform global scaling when local scaling cannot be fulfilled;

dynamically modify, by the global auto-scaler, configuration of the one or more local auto-scalers based on collected performance metrics and information provided by one or more load balancers;

determine, at the global auto-scaler of the scaling arrangement, to perform one or more actions based on at least resource information stored at the global auto-scaler;

wherein the resource information is associated with resources structured in multiple clouds comprising one or more local clusters of resources; and wherein the one or more actions comprise modifying a parameter related to at least one of the resources of the multiple clouds; and send a modifying request to at least one local auto-scaler out of the one or more local auto-scalers, requesting to perform one or more operations related to the modified parameter.

13. The scaling arrangement according to claim 12, wherein the scaling arrangement is configured to modify the parameter by at least one of:

modifying a number of resources of the multiple clouds;

creating an autoscaling rule for the at least one local auto-scaler out of the one or more local auto-scalers; and creating a parameter for the at least one local auto-scaler out of the one or more local auto-scalers.

14. The scaling arrangement according to claim 13, wherein the modifying request requests at least one of:

adding a resource;

removing the resource; and using at least one of the created autoscaling rule and parameter.

15. The scaling arrangement according to claim 13, wherein the scaling arrangement is further configured to send one or more instructions to one or more load balancers, wherein the one or more instructions are related to at least one of:

the created autoscaling rule, the created parameter, and the modified number of resources, wherein the one or more instructions to the one or more load balancers comprise instructions to modify a traffic redirection policy based on the modified number of resources, wherein the modified traffic redirection policy routes user equipment requests to clusters where new resources have been deployed to prevent performance imbalance.

16. The scaling arrangement according to claim 15, wherein the one or more instructions indicate a redirection of requests from one or more user equipments in the communication network.

17. The scaling arrangement according to claim 12, wherein the resource information comprises one or more global performance metrics and the scaling arrangement is configured to perform the determination periodically and to check the one or more global performance metrics provided from one or more local clusters of resources of respective cloud and based on the checked one or more global performance metrics evaluate if a global scaling is needed.

18. The scaling arrangement according to claim 12, wherein the scaling arrangement is configured to:

determine by a local auto-scaler out the one or more local auto-scaler managing a local cluster of resources, that global scaling of resources is needed for the local cluster of resources;

send by the local auto-scaler, a request to the global auto-scaler, requesting for global scaling; and wherein the scaling arrangement is further configured to determine the one or more actions to be performed based on the request and the resource information stored at the global auto-scaler.

19. The scaling arrangement according to claim 18, wherein the request to the global auto-scaler indicates at least one of a cluster identity, ID, a type of the scaling, and a desired amount of resources.

20. The scaling arrangement according to claim 12, wherein the resource information comprises one or more of: global scaling policy and parameter; geographic information; statistical performance metrics from one or more local clusters of respective cloud; and data collected from one or more load balancers.

* * * * *